US011687930B2

(12) United States Patent
Rule et al.

(10) Patent No.: US 11,687,930 B2
(45) Date of Patent: Jun. 27, 2023

(54) SYSTEMS AND METHODS FOR AUTHENTICATION OF ACCESS TOKENS

(71) Applicant: Capital One Services, LLC, McLean, VA (US)

(72) Inventors: Jeffrey Rule, Chevy Chase, MD (US); Kaitlin Newman, Washington, DC (US); Rajko Ilincic, Annandale, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/161,488

(22) Filed: Jan. 28, 2021

(65) Prior Publication Data
US 2022/0237609 A1 Jul. 28, 2022

(51) Int. Cl.
*G06Q 20/40* (2012.01)
*G06Q 20/38* (2012.01)
(Continued)

(52) U.S. Cl.
CPC ..... *G06Q 20/401* (2013.01); *G06Q 20/38215* (2013.01); *H04L 9/0825* (2013.01);
(Continued)

(58) Field of Classification Search
CPC .......... G06Q 20/401; G06Q 20/38215; G06Q 2220/00; H04L 9/0825; H04L 9/3213; H04L 9/3271; H04L 2209/56
(Continued)

(56) References Cited

U.S. PATENT DOCUMENTS

| 4,683,553 | A | 7/1987 | Mollier |
| 4,827,113 | A | 5/1989 | Rikuna |

(Continued)

FOREIGN PATENT DOCUMENTS

| CA | 2 961 916 | 4/2016 |
| CA | 3010336 | 7/2017 |

(Continued)

OTHER PUBLICATIONS

Fillmore, Peter. "Mobile and Contactless Payment and Security." v20111118, Witham Laboratories, on (2011): 1-39 (Year: 2011).*
(Continued)

*Primary Examiner* — Syed A Zaidi
(74) *Attorney, Agent, or Firm* — Hunton Andrews Kurth LLP

(57) ABSTRACT

Systems and methods for authentication may include a first device including a memory, a communication interface, and one or more processors. The memory may include a counter value, transmission data, and at least one key. The one or more processors may be in communication with the memory and communication interface. The one or more processors may be configured to create a cryptogram using the at least one key and counter value, wherein the cryptogram includes the counter value and the transmission data; transmit the cryptogram via the communication interface; update the counter value after cryptogram transmission; receive an encrypted access token via the communication interface; decrypt the encrypted access token; store the decrypted access token in the memory; and transmit, after entry of the communication interface into a communication field, the access token via the communication interface for access to one or more resources, wherein the access token is encrypted.

19 Claims, 7 Drawing Sheets

(51) Int. Cl.
*H04L 9/08* (2006.01)
*H04L 9/32* (2006.01)

(52) U.S. Cl.
CPC .......... *H04L 9/3213* (2013.01); *H04L 9/3271* (2013.01); *G06Q 2220/00* (2013.01); *H04L 2209/56* (2013.01)

(58) Field of Classification Search
USPC ........................................................ 705/75
See application file for complete search history.

(56) References Cited

U.S. PATENT DOCUMENTS

| | | | |
|---|---|---|---|
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Doucem et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Hohmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Mamdani et al. | |
| 8,005,426 B2 | 8/2011 | Huomo et al. | |
| 8,010,405 B1 | 8/2011 | Bortolin et al. | |
| RE42,762 E | 9/2011 | Shin | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,285,329 B1 | 10/2012 | Zhu | |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,894 B1 | 2/2013 | Zhu |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,533,123 B2 * | 9/2013 | Hart .................. G06Q 30/0613 705/64 |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,178,567 B2 | 11/2015 | Klein et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0204732 A1 * | 10/2003 | Audebert ............. H04L 9/3226 713/182 |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |

(56) References Cited

U.S. PATENT DOCUMENTS

| | | |
|---|---|---|
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0235539 A1 | 10/2007 | Sevanto et al. |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207124 A1 | 8/2008 | Raisanen et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0153721 A1 | 6/2010 | Mellqvist |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0042456 A1* | 2/2011 | Masaryk ............. G06Q 20/343 235/380 |
| 2011/0060631 A1 | 3/2011 | Grossman et al. |
| 2011/0068170 A1 | 3/2011 | Lehman |
| 2011/0071949 A1 | 3/2011 | Petrov et al. |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1* | 10/2011 | Coulier ................ H04L 9/3242 713/171 |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0001725 A1 | 1/2012 | Chen |
| 2012/0011070 A1* | 1/2012 | Ward .................... G06Q 20/34 705/72 |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0094603 A1 | 4/2012 | Hoeksel et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0252545 A1 | 9/2013 | Leutgeb et al. |
| 2013/0254844 A1 | 9/2013 | Leutgeb et al. |
| 2013/0282360 A1 | 10/2013 | Shimota et al. |
| 2013/0299596 A1 | 11/2013 | Choi et al. |
| 2013/0303085 A1 | 11/2013 | Boucher et al. |
| 2013/0304651 A1 | 11/2013 | Smith |
| 2013/0307667 A1 | 11/2013 | Yang et al. |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |

(56) References Cited

U.S. PATENT DOCUMENTS

| | | | |
|---|---|---|---|
| 2014/0040147 A1* | 2/2014 | Varadarajan | G06Q 20/3823 705/71 |
| 2014/0047235 A1 | 2/2014 | Lessiak et al. | |
| 2014/0052548 A1* | 2/2014 | Dokken, Jr. | G06Q 50/01 705/14.73 |
| 2014/0067690 A1 | 3/2014 | Pitroda et al. | |
| 2014/0074637 A1 | 3/2014 | Hammad | |
| 2014/0074655 A1 | 3/2014 | Lim et al. | |
| 2014/0081720 A1 | 3/2014 | Wu | |
| 2014/0138435 A1 | 5/2014 | Khalid | |
| 2014/0171034 A1 | 6/2014 | Aleksin et al. | |
| 2014/0171039 A1 | 6/2014 | Bjontegard | |
| 2014/0172700 A1 | 6/2014 | Teuwen et al. | |
| 2014/0180851 A1 | 6/2014 | Fisher | |
| 2014/0208112 A1 | 7/2014 | McDonald et al. | |
| 2014/0214674 A1 | 7/2014 | Narnia | |
| 2014/0220888 A1 | 8/2014 | Shimshoni | |
| 2014/0229375 A1 | 8/2014 | Zaytzsev et al. | |
| 2014/0245391 A1 | 8/2014 | Adenuga | |
| 2014/0256251 A1 | 9/2014 | Caceres et al. | |
| 2014/0258099 A1 | 9/2014 | Rosano | |
| 2014/0258113 A1 | 9/2014 | Gauthier et al. | |
| 2014/0258125 A1 | 9/2014 | Gerber et al. | |
| 2014/0274179 A1 | 9/2014 | Zhu et al. | |
| 2014/0279479 A1 | 9/2014 | Maniar et al. | |
| 2014/0279558 A1* | 9/2014 | Kadi | G06Q 20/388 705/71 |
| 2014/0337235 A1 | 11/2014 | Van Heerden et al. | |
| 2014/0339315 A1 | 11/2014 | Ko | |
| 2014/0346860 A1 | 11/2014 | Aubry et al. | |
| 2014/0365780 A1 | 12/2014 | Movassaghi | |
| 2014/0379361 A1 | 12/2014 | Mahadkar et al. | |
| 2015/0012444 A1 | 1/2015 | Brown et al. | |
| 2015/0019442 A1* | 1/2015 | Hird | H04L 63/062 705/71 |
| 2015/0019443 A1 | 1/2015 | Sheets et al. | |
| 2015/0032635 A1 | 1/2015 | Guise | |
| 2015/0071486 A1 | 3/2015 | Rhoads et al. | |
| 2015/0088757 A1 | 3/2015 | Zhou et al. | |
| 2015/0089586 A1 | 3/2015 | Ballesteros | |
| 2015/0134452 A1 | 5/2015 | Williams | |
| 2015/0140960 A1 | 5/2015 | Powell et al. | |
| 2015/0154595 A1 | 6/2015 | Collinge et al. | |
| 2015/0170138 A1 | 6/2015 | Rao | |
| 2015/0178724 A1 | 6/2015 | Ngo et al. | |
| 2015/0186871 A1 | 7/2015 | Laracey | |
| 2015/0205379 A1 | 7/2015 | Mag et al. | |
| 2015/0287031 A1* | 10/2015 | Radu | G06Q 20/20 705/18 |
| 2015/0302409 A1 | 10/2015 | Malek | |
| 2015/0317626 A1 | 11/2015 | Ran et al. | |
| 2015/0318998 A1 | 11/2015 | Erlikhman et al. | |
| 2015/0332266 A1 | 11/2015 | Friedlander et al. | |
| 2015/0339474 A1 | 11/2015 | Paz et al. | |
| 2015/0371234 A1 | 12/2015 | Huang et al. | |
| 2016/0012465 A1 | 1/2016 | Sharp | |
| 2016/0019548 A1 | 1/2016 | Gangi | |
| 2016/0021091 A1* | 1/2016 | Hoyer | H04W 12/08 726/9 |
| 2016/0026997 A1 | 1/2016 | Tsui et al. | |
| 2016/0036790 A1* | 2/2016 | Shastry | G06Q 20/102 713/168 |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0065370 A1 | 3/2016 | Le Saint et al. | |
| 2016/0087957 A1 | 3/2016 | Shah et al. | |
| 2016/0092696 A1 | 3/2016 | Guglani et al. | |
| 2016/0148193 A1 | 5/2016 | Kelley et al. | |
| 2016/0156603 A1 | 6/2016 | Janik | |
| 2016/0232523 A1 | 8/2016 | Venot et al. | |
| 2016/0239672 A1 | 8/2016 | Khan et al. | |
| 2016/0253651 A1* | 9/2016 | Park | G06Q 20/34 705/39 |
| 2016/0255072 A1 | 9/2016 | Liu | |
| 2016/0267486 A1 | 9/2016 | Mitra et al. | |
| 2016/0277383 A1 | 9/2016 | Guyomarc'h et al. | |
| 2016/0277388 A1 | 9/2016 | Lowe et al. | |
| 2016/0307186 A1* | 10/2016 | Noë | G06Q 20/204 |
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0330027 A1 | 11/2016 | Ebrahimi | |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Sclupperheijn | |
| 2017/0041759 A1 | 2/2017 | Gantert et al. | |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0167208 A1 | 6/2018 | Le Saint et al. | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0238517 A1 | 8/2019 | D'Agostino et al. | |
| 2020/0259659 A1 | 8/2020 | Rule et al. | |
| 2020/0286085 A1* | 9/2020 | Mestre | H04L 9/0643 |
| 2021/0176062 A1* | 6/2021 | Chitalia | H04L 9/0891 |

FOREIGN PATENT DOCUMENTS

| | | |
|---|---|---|
| CN | 101192295 | 6/2008 |
| CN | 102165467 | 8/2011 |
| CN | 103023643 | 4/2013 |
| CN | 103417202 | 12/2013 |
| CN | 102983886 | 11/2015 |
| DE | 102012022181 | 6/2013 |
| EA | 2 852 070 | 1/2009 |
| EP | 1 085 424 | 3/2001 |
| EP | 1 223 565 | 7/2002 |
| EP | 1 265 186 | 12/2002 |
| EP | 1 783 919 | 5/2007 |
| EP | 1 942 468 | 7/2008 |

(56) References Cited

FOREIGN PATENT DOCUMENTS

| | | |
|---|---|---|
| EP | 2 457 221 | 8/2009 |
| EP | 2 139 196 | 12/2009 |
| EP | 1 469 419 | 2/2012 |
| EP | 2 677 790 | 12/2013 |
| EP | 3 067 813 | 9/2016 |
| GB | 2 516 861 | 2/2015 |
| GB | 2 539 765 | 12/2016 |
| GB | 2 551 907 | 1/2018 |
| KR | 101508320 | 4/2015 |
| KR | 20150090099 | 8/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Jayasinghe, Danushka, et al. "Enhancing EMV Tokenisation with Dynamic Transaction Tokens." International Workshop on Radio Frequency Identification: Security and Privacy Issues. Springer, Cham, 2016 (Year: 2016).*
NPL Search Terms (Year: 2021).*
NPL Search Terms (Year: 2022).*
NPL Search Terms (Year: 2023).*
Batina, Lejla and Poll, Erik, "SmartCards and RFID," PowerPoint Presentation for IPA Security Course, Digital Secmity at University of Nijmegen, Netherlands (date unknown), 75 pages.
Haykin M. and Wamar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019], Retrieved from Internet URL: https://merchant-channel.americanexpress.com/merchant/en_US/cardrefresher, 2 pages.
Author Unknown, "Add Account Updater to yom recurring payment tool," [online] 2018-2019 [retrieved on Mar. 25, 2019], Retrieved from Internet URL: https://www.authorize.net/our-features/account-updater/, 5 pages.
Author Unknown, "Visa® Account Updater for Merchants," [online] 2019 [retrieved on Mar. 25, 2019], Retrieved from Internet URL: https://usa.visa.eom/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019], Retrieved from Internet URL: https://support.apple.com/en-US/HT205583, 5 pages.

Author Unknown, "Contactless Specifications for Payment Systems," EMV Book B—Entry Point Specification [online] 2016 [retrieved on Mar. 25, 2019], Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019], Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018], Retrieved from Internet URL: https://squareup.com/guides/nfc, 8 pages.
Profis, S., "Everything you need to know about NFC and mobile payments" CNET Directory [online], 2014 [retrieved on Mar. 25, 2019], Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019], Retrieved from the Internet URL: https://www.cnet.com/how-to/copy-data-from-other-devices-in-android-5-0-lollipop-setup/, 5 pages.
Kevin, Android Enthusiast, "How to copy text suing from nfc tag" StackExchange [online] 2013 [retrieved on Mar. 25, 2019], Retrieved from the Internet URL: https://android.stackexchange.com/questions/55689/how-to-copy-text-suing-from-nfc-tag, 11 pages.
Author unknown, "Tap & Go Device Setup" Samsung [online] date unknown [retrieved on Mar. 25, 2019], Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019], Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019], Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019], Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019], Retrieved from Internet URL: https://www.cs.umd.edu/~jkatz/papers/aggregateMAC.pdf, 11 pages.
Adams, D., and Maier, A-K, "Goldbug BIG SEVEN open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018], Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019], Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019], Retrieved from Internet URL: https://eprint.iacr.org/2017/509.pdf, 41 pages.
Saxena, N., "Lecture 10: NMAC, HMAC and Number Theory", CS 6903 Modem Cryptography [online] 2008 [retrieved on Mar. 25, 2019], Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019], Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019], Retrieved from Internet URL: https://www.amazon.com/ask/questions/Tx1RJXYSPE6XLJD?_encodi . . . , 2 pages.

(56) References Cited

OTHER PUBLICATIONS

Author Unknown, "Multi-Factor Authentication", idaptive [online] 2019 [retrieved on Mar. 25, 2019], Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

van den Breekel, J., et al., "EMV inanutshell", Technical Report, 2016 [retrieved on Mar. 25, 2019], Retrieved from Internet URL: https://www.es.ru.nl/E.Poll/papers/EMVtechreport.pdf, 37 pages.

Author Unknown, "Autofill", Computer Hope [online] 2018 [retrieved on Mar. 25, 2019], Retrieved from Internet URL: https://www.computerhope.eom/jargon/a/autofill.htm, 2 pages.

Author Unknown, "Fill out forms automatically", Google Chrome Help [online] 2019 [retrieved on Mar. 25, 2019], Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019], Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mamitius [online] [retrieved on Mar. 25, 2019], Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019], Retrieved from Internet URL: https://www.bankrate.com/banking/banking-app-location-sharing/, 6 pages.

Author unknown: "onetappayment™", [online] Jan. 24, 2019, [retrieved on Mar. 25, 2019], Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019], Retrieved from Internet URL: https://www.annexcloude.com/blog/benefits-unified-platform/, 13 pages.

International Search Report and the Written Opinion of the International Searching Authority issued in related PCT Application No. PCT/US2022/013893 dated Apr. 25, 2022.

* cited by examiner

SYSTEMS AND METHODS FOR AUTHENTICATION OF ACCESS TOKENS

FIELD OF THE DISCLOSURE

The present disclosure relates to systems and methods for authentication of access tokens.

BACKGROUND

Card-based transactions are becoming increasingly common. These transactions often involve the use of a card in communication with a point of sale device, a server, or other device. It is necessary to protect such communications from interception and unauthorized access. However, transmission of data in the clear, i.e., without encryption or other protection, is susceptible to phishing attacks and replay attacks, resulting in increased security risks and account or card misuse. These risks may be increased through the use of contactless cards, which communication with other devices wirelessly.

These and other deficiencies exist. Accordingly, there is a need for systems and methods for authenticating access tokens that overcome these deficiencies and provides access to one or more resources in a secure and reliable manner by protecting communications from interception and unauthorized access.

SUMMARY OF THE DISCLOSURE

Embodiments of the present disclosure provide a first device, comprising. The first device may include a memory including a counter value, transmission data, and at least one key. The first device may include a communication interface. The first device may include one or more processors in communication with the memory and communication interface. The one or more processors may be configured to create a cryptogram using the at least one key and counter value, wherein the cryptogram includes the counter value and the transmission data. The one or more processors may be configured to transmit the cryptogram via the communication interface. The one or more processors may be configured to update the counter value after transmission of the cryptogram. The one or more processors may be configured to receive an encrypted access token via the communication interface. The one or more processors may be configured to decrypt the encrypted access token. The one or more processors may be configured to store the decrypted access token in the memory. The one or more processors may be configured to transmit, after entry of the communication interface into a communication field, the access token via the communication interface for access to one or more resources, wherein the access token is encrypted.

Embodiments of the present disclosure provide an authentication method. The method may include creating a cryptogram using at least one key and counter value, wherein the cryptogram includes the counter value and transmission data. The method may include transmitting, via a communication interface, the cryptogram. The method may include updating the counter value. The method may include receiving, via the communication interface, an encrypted access token. The method may include decrypting the encrypted access token. The method may include storing the decrypted access token in memory. The method may include transmitting, after entry of the communication interface into a communication field, the access token via the communication interface to receive access to one or more resources, wherein the access token is encrypted.

Embodiments of the present disclosure provide a computer readable non-transitory medium comprising computer-executable instructions that are executed on a processor and comprising the steps of: creating a cryptogram using one or more keys and a counter value, wherein the cryptogram includes the counter value and transmission data; transmitting the cryptogram; updating the counter value; receiving an encrypted access token; decrypting the encrypted access token; transmitting, after entry of a communication interface into a communication field, the access token via the communication interface, wherein the access token is encrypted; and receiving, after authentication of the access token, access to one or more resources

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Benefits of the systems and methods disclosed herein include improved security to provide access to one or more resources by protecting communications from interception and unauthorized access. The systems and methods disclosed herein allow for the avoidance of phishing attacks and preventing replay attacks through encrypted data communications and the removal of the need to send data in the clear. In addition, by generating and authenticating access tokens and challenge responses, access tokens and cards may be securely issued, validated, and reissued, rather than collecting the cards, and programming each card for reissuance, thereby mitigating security risks, improving the user experience, and improving transaction efficiency. Accordingly, the systems and methods disclosed herein reduce the risk of fraudulent activity, such as misuse of the card or an account associated with the card.

Figure 1:
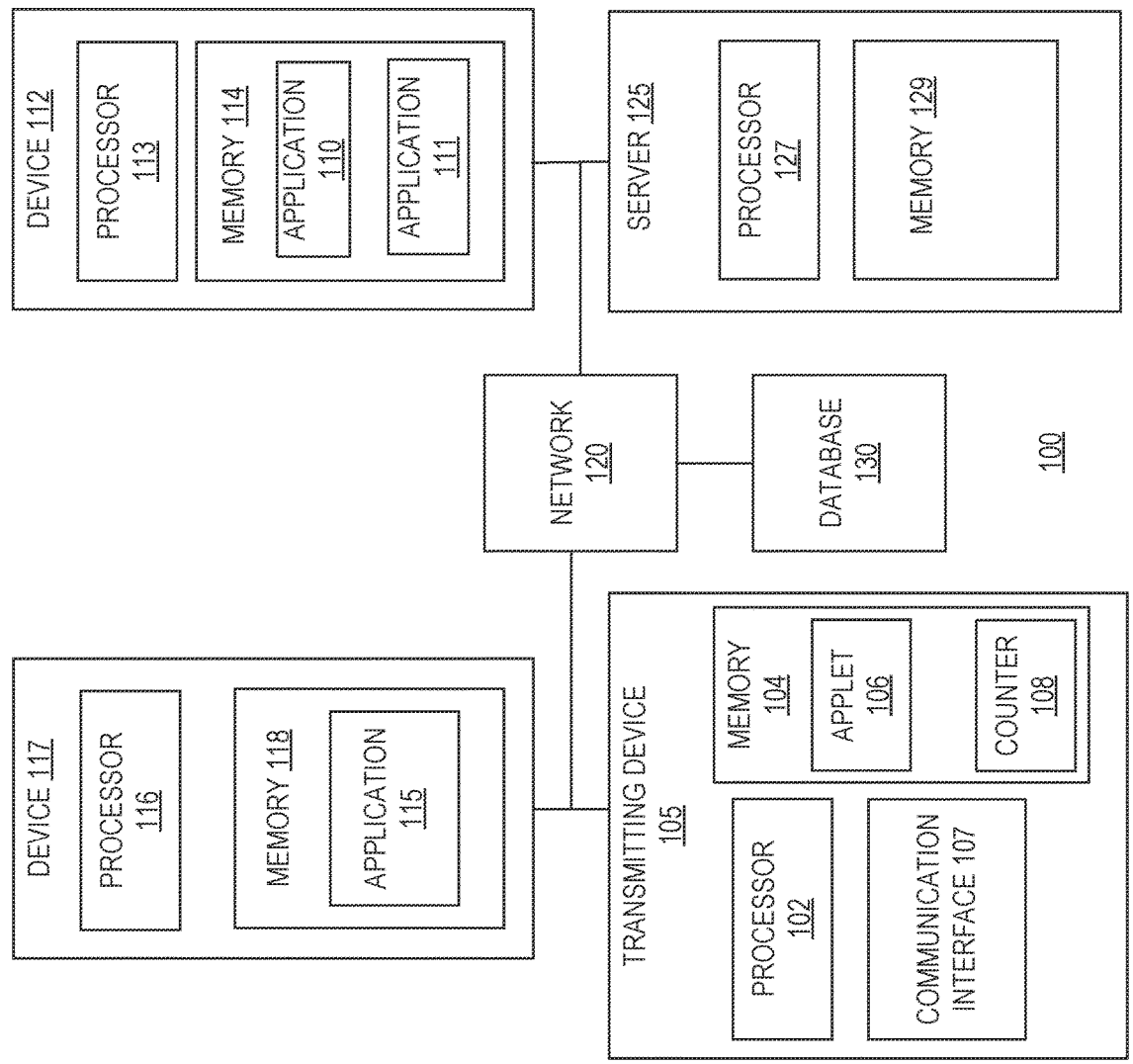
FIG. 1 depicts an authentication system according to an exemplary embodiment.

FIG. 1 illustrates an authentication system 100. The system 100 may comprise a first device 105, a second device 112, a third device 117, a network 120, a server 125, and a database 130. Although FIG. 1 illustrates single instances of components of system 100, system 100 may include any number of components.

System 100 may include a first device 105. The first device 105 may comprise a contactless card, a contact-based card, or other device described herein. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and at least one key.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the second device 112, third device 117, server 125, and/or database 130 via network 120.

First device 105 may be in data communication with any number of components of system 100. For example, first device 105 may transmit data via network 120 to second device 112, third device 117, and/or server 125. First device 105 may transmit data via network 120 to database 130. In some examples, first device 105 may be configured to transmit data via network 120 after entry into one or more communication fields of any device. Without limitation, each entry may be associated with a tap, a swipe, a wave, and/or any combination thereof.

System 100 may include a second device 112. The second device 112 may include one or more processors 113, and memory 114. Memory 114 may include one or more applications, including but not limited to first application 110 and second application 111. Second device 112 may be in data communication with any number of components of system 100. For example, second device 112 may transmit data via network 120 to server 125. Second device 112 may transmit data via network 120 to database 130. Without limitation, second device 112 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. Second device 112 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 112 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 112 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a third device 117. The third device 117 may include one or more processors 116, and memory 118. Memory 118 may include one or more applications, such as application 115. Third device 117 may be in data communication with any number of components of system 100. For example, third device 117 may transmit data via network 120 to server 125. Third device 117 may transmit data via network 120 to database 130. Without limitation, third device 117 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, a reader, or other device. Third device 117 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The third device 117 may include processing circuitry and may contain additional components, including processors, memories, error and parity/CRC checkers, data encoders, anticollision algorithms, controllers, command decoders, security primitives and tamperproofing hardware, as necessary to perform the functions described herein. The third device 117 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 120. In some examples, network 120 may be one or more of a wireless network, a wired network or any combination of wireless network and wired network, and may be configured to connect to any one of components of system 100. For example, first device 105 may be configured to connect to server 125 via network 120. In some examples, network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 may include, without limitation, telephone lines, fiber optics, IEEE Ethernet 902.3, a wide area network, a wireless personal area network, a LAN, or a global network such as the Internet. In addition, network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

System 100 may include one or more servers 125. In some examples, server 125 may include one or more processors 127 coupled to memory 129. Server 125 may be configured as a central system, server or platform to control and call various data at different times to execute a plurality of workflow actions. Server 125 may be configured to connect to first device 105. Server 125 may be in data communication with the applet 106, application 110, application 111, and/or application 115. For example, a server 125 may be in data communication with applet 106 via one or more networks 120. First device 105 may be in communication with one or more servers 125 via one or more networks 120, and may operate as a respective front-end to back-end pair with server 125. First device 105 may transmit, for example from applet 106 executing thereon, one or more requests to server 125. The one or more requests may be associated with retrieving data from server 125. Server 125 may receive the one or more requests from first device 105. Based on the one or more requests from applet 106, server 125 may be configured to retrieve the requested data. Server 125 may be configured to transmit the received data to applet 106, the received data being responsive to one or more requests.

In some examples, server 125 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 125, it is understood that other embodiments can use multiple servers or multiple computer systems as necessary or desired to support the users and can also use back-up or redundant servers to prevent network downtime in the event of a failure of a particular server.

Server 125 may include an application comprising instructions for execution thereon. For example, the application may comprise instructions for execution on the server 125. The application may be in communication with any components of system 100. For example, server 125 may execute one or more applications that enable, for example, network and/or data communications with one or more components of system 100 and transmit and/or receive data. Without limitation, server 125 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 125 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 125 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 125 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include one or more databases 130. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by any component of system 100, such as the first device 105 or server 125, or the database 130 may be hosted externally to any component of the system 100, such as the first device 105 or server 125, by a cloud-based platform, or in any storage device that is in data communication with the first device 105 and server 125. In some examples, database 130 may be in data communication with any number of components of system 100. For example, server 125 may be configured to retrieve the requested data from the database 130 that is transmitted by applet 106. Server 125 may be configured to transmit the received data from database 130 to applet 106 via network 120, the received data being responsive to the transmitted one or more requests. In other examples, applet 106 may be configured to transmit one or more requests for the requested data from database 130 via network 120.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, server 125, and/or database 130, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The one or more processors 102 may be configured to create a cryptogram using the at least one key and the counter value. The cryptogram may include the counter value and the transmission data. The one or more processors 102 may be configured to transmit the cryptogram via the communication interface 107. For example, the one or more processors 102 may be configured to transmit the cryptogram to one or more applications. In some examples, the one or more processors 102 may be configured to transmit the cryptogram to a first application 110 comprising instructions for execution on a second device 112. The one or more processors 102 may be configured to update the counter value after transmission of the cryptogram. The one or more processors 102 may be configured to receive an access token via the communication interface 107. For example, the one or more processors 102 may be configured to receive the access token from the first application 110. In some examples, the access token may be generated and/or encrypted by the first application 110. In some examples, the access token may be created when a user authenticates into a first or primary system, which may comprise an application, including but not limited to first application 110 comprising instructions for execution on second device 112, or a network login, including but not limited to login associated with network 120. At that point, the access token may be created that encapsulates the security identity that has been established through presenting one or more credentials, including but not limited to at least one selected from the group of a username and/or password, a mobile device number, an account number, a card number, and a biometric (e.g., facial scan, a retina scan, a fingerprint, and a voice input for voice recognition). A database, such as database 130, that is initially authenticated against, may be configured to create the token. In this model, the access token is then encrypted and transmitted to the first device 105 for secure storage. When a user wishes to gain access to a second system, the first device 105 may be presented and the second system may be configured to query for it. To the extent that the access token is still valid and the first and second systems respect each other, through a protocol such as OAuth or Security Assertion Markup Language (SAML), the user may gain access to the secondary system. In some examples, the access token may be encrypted prior to transmission. For example, the first application 110 may be configured to encrypt the access token prior to transmission to the one or more processors 102 of the first device 105.

The one or more processors 102 may be configured to decrypt the access token. The one or more processors 102 may be configured to store the access token in the memory 104. The one or more processors 102 may be configured to transmit, after one or more entries of the communication interface 107 into a communication field of any device, the access token. The one or more entries may be associated with at least one selected from the group of a tap, a swipe, a wave, and/or any combination thereof. For example, the one or more processors 102 may be configured to transmit the access token to the first application 110. The access token may be transmitted via near field communication (NFC). Without limitation, the access token may be transmitted via Bluetooth, Wi-Fi, RFID.

In another example, the one or more processors 102 may be configured to transmit the access token to a second application 111 comprising instructions for execution on the second device 112. The one or more processors 102 may be configured to transmit, after one or more entries of the communication interface 107 into a communication field of the second device 112, the access token. The one or more entries may be associated with at least one selected from the group of a tap, a swipe, a wave, and/or any combination thereof. For example, the one or more processors 102 may be configured to transmit the access token to the second application 111. The access token may be transmitted via near field communication (NFC). Without limitation, the access token may be transmitted via Bluetooth, Wi-Fi, RFID.

In another example, the one or more processors 102 may be configured to transmit the access token to an application 115 comprising instructions for execution on a third device. 117 The one or more processors 102 may be configured to transmit, after one or more entries of the communication interface 107 into a communication field of a third device 117, the access token. The one or more entries may be associated with at least one selected from the group of a tap, a swipe, a wave, and/or any combination thereof. The access token may be transmitted via near field communication (NFC). Without limitation, the access token may be transmitted via Bluetooth, Wi-Fi, RFID.

The access token may be transmitted for verification prior to providing access to one or more resources. For example, the application 115 comprising instructions for execution on a third device 117 may be configured to receive the access token from the one or more processors 102 and verify the access token by transmitting one or more requests to one or more servers 125. The one or more servers 125 may be configured to receive the one or more requests from the application 115 comprising instructions for execution on the third device 117. The one or more requests may include the access token. The one or more servers 125 may be configured to verify the access token by comparison with a reference access token to determine a successful match. In some examples, the server 125 may be configured to verify the access token. If the comparison between the access token and reference access token yields a successful match, the access token is verified and access is provided to one or more resources. If the comparison between the access token and the reference access token yields an unsuccessful match, access to one or more resources may further proceed in the following manner. For example, the access to one or more resources may be denied based on the determination of an unsuccessful match. In another example, the access to one or more resources may be re-attempted up to and including a predetermined threshold number of times by re-sending and re-receiving the access token before denying access to one or more resources. In this manner, access to one or more resources may be denied and/or permission privileges may be revoked after token usage, as further discussed below.

In some examples, a database 130 may be configured to verify the access token. For example, the one or more servers 125 may be configured to verify the access token by transmitting one or more requests to a database 130. The one or more requests may include the access token. The database 130 may be configured to receive the one or more requests from the one or more servers 125. The database 130 may be configured to verify the access token by comparison with a reference access token to determine a successful match. If the comparison between the access token and reference access token yields a successful match, the access token is verified and access is provided to one or more resources. If the comparison between the access token and the reference access token yields an unsuccessful match, access to one or more resources may further proceed in the following manner. In some examples, the access to one or more resources may be denied based on the determination of an unsuccessful match. In other examples, the request for access to one or more resources may be re-attempted up to and including a predetermined threshold number of times by re-sending and re-receiving the access token before denying access to one or more resources. In this manner, access to one or more resources may be denied and/or permission privileges may be revoked after token usage, as further discussed below.

The access token may comprise a limited use token. The access token may include one or more elements, such as an access identifier. The access identifier may be configured to allow a user to be identified across a plurality of systems, such as the first system and the second system. The access identifier may be unique to the user, tied to a login session, and/or any combination thereof. In some examples, the access identifier may comprise a group of identifiers which may be configured to describe the user as belonging to one or more access groups. In some examples, the token may include a one-time use token. In other examples, the token may include a time-based token. For example, the token may be restricted to usage for a predetermined time period, such as at least one selected from the group of seconds, minutes, hours, days, weeks, months, years, and/or any combination thereof. After the token has been used, for example after a one-time usage and/or after expiration of a predetermined time period usage, the token may be invalidated and no longer usable.

In some examples, the first application 110 comprising instructions for execution on the second device 112 may be a different application than the second application 111 comprising instructions for execution on the second device 112. In some examples, the second device 112 may be a different device than the third device 117. In some examples, the third device 117 may be external to the second device 112. For example, the third device 117 may not be part of the second device 112. In some examples, the third device 117 may be integral with the second device 112. For example, the third device 117 may be a part of or internal to the second device 112. The third device 117 may comprise a reader, such as a card reader. In some examples, the card reader may be configured to provide access to a physical space. In some examples, the card reader may be configured to provide access to a digital experience. In some examples, the card reader may be configured to provide access to a ticketed event. In some examples, the card reader may be configured to provide access to a safe deposit box. In some examples, the card reader may be configured to provide access to another device, such as a network-enabled computer.

In other examples, the one or more processors 102 may be configured to receive one or more challenges via the communication interface 107 from the first application 110 comprising instructions for execution on the second device 112. The challenge may include a public key and an encrypted test. The one or more processors 102 may be configured to transmit one or more responses that are responsive to the one or more challenges via the communication interface 107. For example, the one or more processors 102 may be configured to transmit, via the communication interface 107, a challenge response to the first application 110 comprising instructions for execution on the second device 112.

In other examples, the one or more processors 102 may be configured to receive one or more challenges via the communication interface 107. For example, the one or more processors 102 may be configured to receive a challenge from the application 115 comprising instructions for execution on the third device 117. The challenge may include a public key and an encrypted test. The one or more processors 102 may be configured to transmit one or more responses that are responsive to the one or more challenges via the communication interface 107. For example, the one or more processors 102 may be configured to transmit, via the communication interface 107, a challenge response to the application 115 comprising instructions for execution on the third device 117.

The one or more processors 102 may be configured to decrypt the encrypted test. For example, the one or more processors 102 may be configured to decrypt the encrypted test using the private key and generate a decrypted test. In some examples, the one or more processors 102 may be configured to include the decrypted test in the challenge response transmitted, via the communication interface 107. In some examples, the one or more processors 102 may be configured to transmit, via the communication interface 107, the challenge response including the decrypted test to the first application 110 comprising instructions for execution on the second device 112. In other examples, the one or more processors 102 may be configured to transmit, via the communication interface 107, the challenge response including the decrypted test to the second application 111 comprising instructions for execution on the second device 112. In other examples, the one or more processors 102 may be configured to transmit, via the communication interface 107, the challenge response including the decrypted test to the application 115 comprising instructions for execution on the third device 117.

The second device 112 and/or third device 117 may be in data communication with one or more servers 125 and/or one or more databases 130. In some examples, the first application 110 and second application 111 comprising instructions for execution on the second device 112 may be in data communication with the one or more servers 125 and/or one or more databases 130 via network 120. The application 115 comprising instructions for execution on the third device 117 may be in data communication with the one or more servers 125 and/or one or more databases 130 via network 120. The server 125 may be configured to receive one or more challenges from the application 115 comprising instructions for execution on the third device 117. The application 115 comprising instructions for execution on the third device 117 may be configured to transmit the one or more challenges to the server 125. The challenge may include a public key and an encrypted test. The server 125 may be configured to transmit one or more responses to the application 115 comprising instructions for execution on the third device 117 and that are responsive to the one or more challenges. The server 125 may be configured to generate a decrypted test by decrypting the encrypted test using the private key. In addition, the server 125 may be configured to include the decrypted test in the challenge response.

In some examples, the card reader may be configured to provide access to one or more resources, such as a physical space. As discussed above, the card reader may be internal to the second device 112. In other examples, the card reader may be external to the second device 112, such as a part of a third device 117. For example, the access may be provided after successful authentication of the token. In some examples, the card reader may be configured to provide access to the physical space after one or more entries of the communication interface 107 into a communication field of a device, such as device 112 or device 117, associated with the card reader. Without limitation, the physical space may include any space of a building, a room, a school, a governmental agency, an elevator, or the like such that the card reader is configured to grant access thereto via the one or more entries that are part of the token validation. In some examples, the physical space may also include any space or location where mobile devices, such as a cell phone or tablet or laptop or universal serial bus device, are restricted or otherwise prohibited, such as a cloud server facility or governmental facility or any other secure facility.

In some examples, the card reader may be configured to provide access to a digital experience. As discussed above, the card reader may be internal to the second device 112. In other examples, the card reader may be external to the second device 112, such as a part of a third device 117. For example, the access may be provided after successful authentication of the token. In some examples, the card reader may be configured to provide access to the digital experience after one or more entries of the communication interface 107 into a communication field of a device, such as device 112 or device 117, associated with the card reader. Without limitation, the digital experience may be associated with any application comprising instructions for execution on any device, a virtual reality program, a mobile or web browser, an email client, a game, or the like.

In some examples, the card reader may be configured to provide access to a ticketed event. As discussed above, the card reader may be internal to the second device 112. In other examples, the card reader may be external to the second device 112, such as a part of a third device 117. For example, the access may be provided after successful authentication of the token. In some examples, the card reader may be configured to provide access to the ticketed event after one or more entries of the communication interface 107 into a communication field of a device, such as device 112 or device 117, associated with the card reader. Without limitation, the ticketed event may be associated with a school event, a sporting event, a concert event, a private event, a government event, a music event, or the like.

In some examples, the card reader may be configured to provide access to a safe deposit box. As discussed above, the card reader may be internal to the second device 112. In other examples, the card reader may be external to the second device 112, such as a part of a third device 117. For example, the access may be provided after successful authentication of the token. In some examples, the card reader may be configured to provide access to the safe deposit box after one or more entries of the communication interface 107 into a communication field of a device, such as device 112 or device 117, associated with the card reader. In some examples, the card reader may be external to the safe deposit box. In other examples, the card reader may be internal to the safe deposit box. In some examples, the safe deposit box may comprise a storage enclosure configured to store one or more items, such as a product or grocery item, available for access to the retrievable one or more items.

In some examples, the card reader may be configured to provide access to another device, such as a network-enabled computer. In other examples, the card reader can be configured to provide access to a secure or offline computer, configured for communication only with the card reader. The card reader may be configured to read the access token from the first device 105 and pass it to the reader. The card reader may be configured to share the access token with or otherwise make accessible to the authentication system 100. As previously explained, to the extent that the authentication system 100 respects the access token, through a protocol such as OAuth or SAML, then the user may gain access to authentication system 100.

Figure 2A:
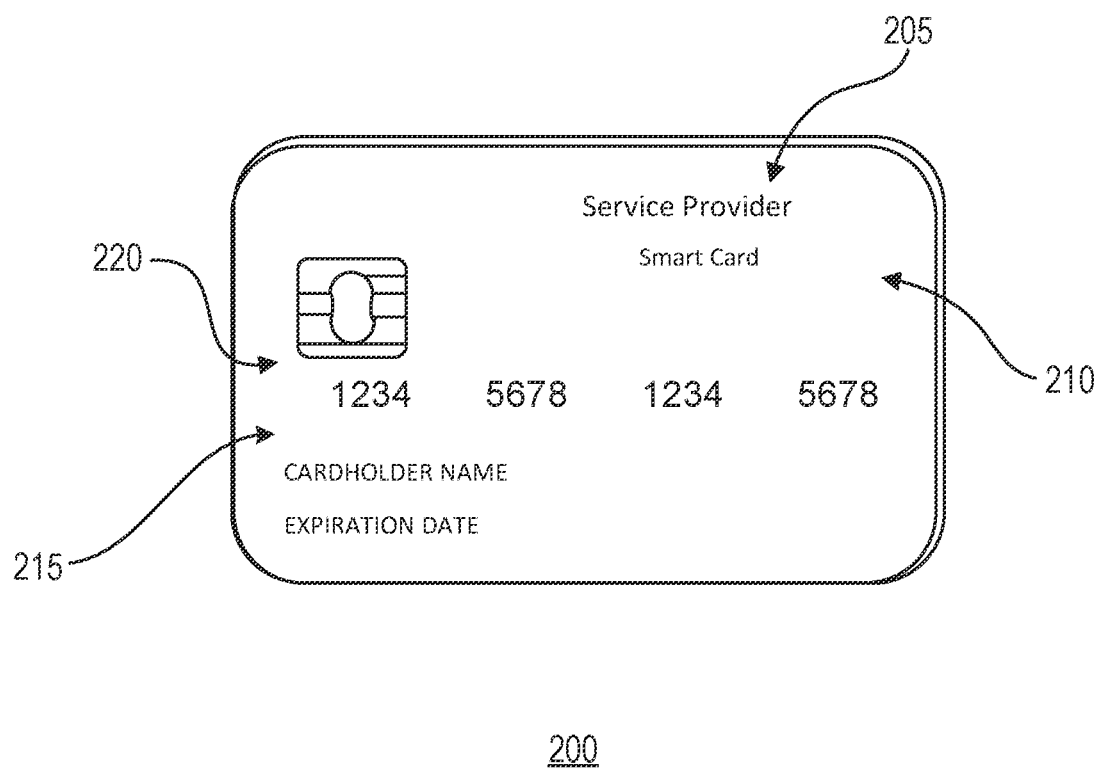
FIG. 2A is an illustration of a contactless card according to an exemplary embodiment.

FIG. 2A illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card or contactless card, which may comprise a payment card, such as a credit card, debit card, or gift card, issued by a service provider 205 displayed on the front or back of the card 200. In some examples, the contactless card 200 is not related to a payment card, and may comprise, without limitation, an identification card, a membership card, and a transportation card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
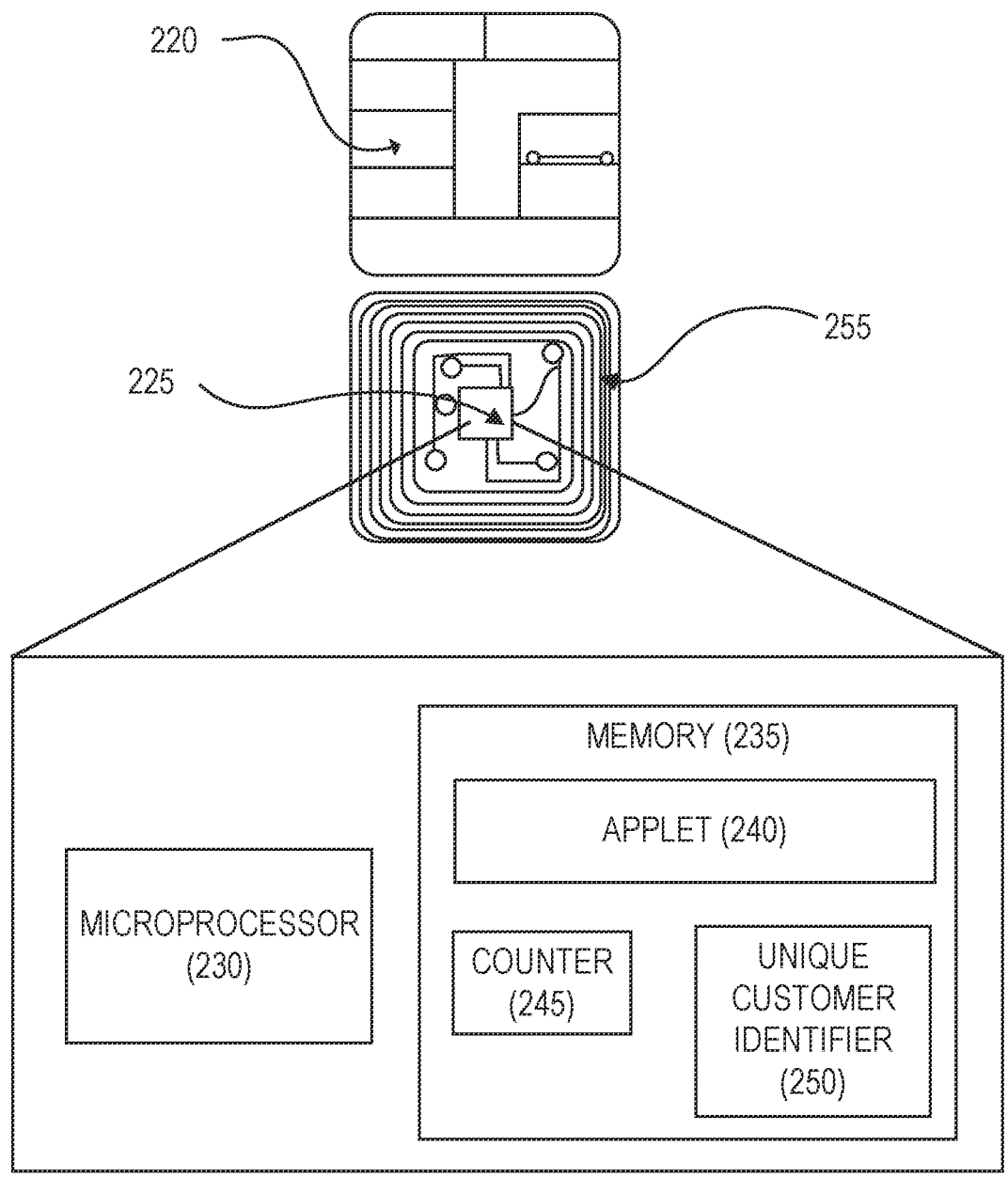
FIG. 2B is an illustration of a contact pad of a contactless card according to an exemplary embodiment.

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
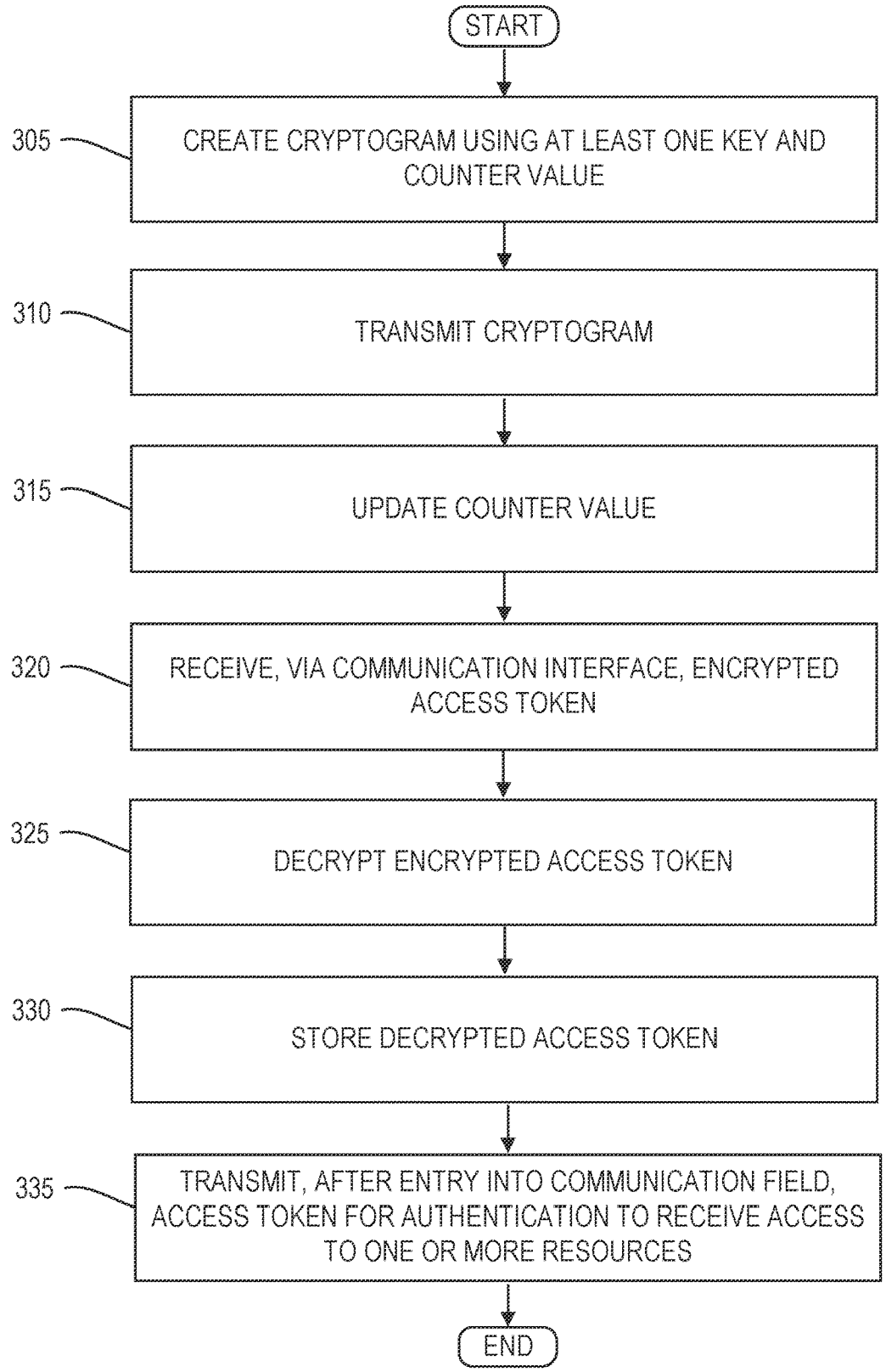
FIG. 3 depicts a method of authentication according to an exemplary embodiment.

FIG. 3 depicts a method 300 of authentication. FIG. 3 may reference the same or similar components of system 100, and first device 200 of FIG. 2A and FIG. 2B.

At block 305, the method 300 may include creating a cryptogram using at least one key and a counter value. For example, one or more processors of a first device may be configured to create a cryptogram using the at least one key and the counter value. The cryptogram may include the counter value and the transmission data. The first device may include a memory containing one or more keys, including the at least one key, a counter value, and the transmission data. The first device may further include a communication interface.

At block 310, the method 300 may include transmitting the cryptogram. For example, the one or more processors may be configured to transmit the cryptogram via the communication interface. For example, the one or more processors may be configured to transmit the cryptogram to one or more applications. In some examples, the one or more processors may be configured to transmit the cryptogram to a first application comprising instructions for execution on a second device.

At block 315, the method 300 may include updating the counter value. For example, the one or more processors may be configured to update the counter value after transmission of the cryptogram.

At block 320, the method 300 may include receiving, via a communication interface, an encrypted access token. For example, the one or more processors may be configured to receive an access token via the communication interface. In some examples, the one or more processors may be configured to receive the access token from the first application. In some examples, the access token may be generated and/or encrypted by the first application. In some examples, the access token may be created when a user authenticates into a first or primary system, which may comprise an application, including but not limited to first application comprising instructions for execution on second device, or a network login. At that point, the access token may be created that encapsulates the security identity that has been established through presenting one or more credentials, including but not limited to at least one selected from the group of a username and/or password, a mobile device number, an account number, a card number, and a biometric (e.g., facial scan, a retina scan, a fingerprint, and a voice input for voice recognition). A database that is initially authenticated against, may be configured to create the token. In this model, the access token is then encrypted and transmitted to the first device for secure storage. When a user wishes to gain access to a second system, the first device may be presented and the second system may be configured to query for it. To the extent that the access token is still valid and the first and second systems respect each other, through a protocol such as OAuth or SAML, the user may gain access to the secondary system. In some examples, the access token may be encrypted prior to transmission. For example, the first application may be configured to encrypt the access token prior to transmission to the one or more processors of the first device.

At block 325, the method 300 may include decrypting the encrypted access token. For example, the one or more processors may be configured to decrypt the access token.

At block 330, the method 300 may include storing the decrypted access token. For example, the one or more processors may be configured to store the access token in the memory.

At block 335, the method 300 may include transmitting, after entry of the communication interface into a communication field, the access token for authentication to receive access to one or more resources. For example, the one or more processors may be configured to transmit, after one or more entries of the communication interface into a communication field of any device, the access token. The one or more entries may be associated with at least one selected from the group of a tap, a swipe, a wave, and/or any combination thereof. For example, the one or more processors may be configured to transmit the access token to the first application. The access token may be transmitted via near field communication (NFC). Without limitation, the access token may be transmitted via Bluetooth, Wi-Fi, RFID.

In another example, the one or more processors may be configured to transmit the access token to a second application comprising instructions for execution on the second device. The one or more processors may be configured to transmit, after one or more entries of the communication interface into a communication field of the second device, the access token. The one or more entries may be associated with at least one selected from the group of a tap, a swipe, a wave, and/or any combination thereof. For example, the one or more processors may be configured to transmit the access token to the second application. The access token may be transmitted via near field communication (NFC). Without limitation, the access token may be transmitted via Bluetooth, Wi-Fi, RFID.

In another example, the one or more processors may be configured to transmit the access token to an application comprising instructions for execution on a third device. The one or more processors may be configured to transmit, after one or more entries of the communication interface into a communication field of a third device, the access token. The one or more entries may be associated with at least one selected from the group of a tap, a swipe, a wave, and/or any combination thereof. The access token may be transmitted via near field communication (NFC). Without limitation, the access token may be transmitted via Bluetooth, Wi-Fi, RFID.

The access token may be transmitted for verification prior to providing access to one or more resources. For example, the application comprising instructions for execution on a third device may be configured to receive the access token from the one or more processors and verify the access token by transmitting one or more requests to one or more servers. The one or more servers may be configured to receive the one or more requests from the application comprising instructions for execution on the third device. The one or more requests may include the access token. The one or more servers may be configured to verify the access token by comparison with a reference access token to determine a successful match. In some examples, the server may be configured to verify the access token. If the comparison between the access token and reference access token yields a successful match, the access token is verified and access is provided to one or more resources. If the comparison between the access token and the reference access token yields an unsuccessful match, access to one or more resources may further proceed in the following manner. For example, the access to one or more resources may be denied based on the determination of an unsuccessful match. In another example, the access to one or more resources may be re-attempted up to and including a predetermined threshold number of times by re-sending and re-receiving the access token before denying access to one or more resources. In this manner, access to one or more resources may be denied and/or permission privileges may be revoked after token usage, as further discussed below.

In some examples, a database may be configured to verify the access token. For example, the one or more servers may be configured to verify the access token by transmitting one or more requests to a database. The one or more requests may include the access token. The database may be configured to receive the one or more requests from the one or more servers. The database may be configured to verify the access token by comparison with a reference access token to determine a successful match. If the comparison between the access token and reference access token yields a successful match, the access token is verified and access is provided to one or more resources. If the comparison between the access token and the reference access token yields an unsuccessful match, access to one or more resources may further proceed in the following manner. In some examples, the access to one or more resources may be denied based on the determination of an unsuccessful match. In other examples, the request for access to one or more resources may be re-attempted up to and including a predetermined threshold number of times by re-sending and re-receiving the access token before denying access to one or more resources. In this manner, access to one or more resources may be denied and/or permission privileges may be revoked after token usage, as further discussed below.

The access token may comprise a limited use token. The access token may include one or more elements, such as an access identifier. The access identifier may be configured to allow a user to be identified across a plurality of systems, such as the first system and the second system. The access identifier may be unique to the user, tied to a login session, and/or any combination thereof. In some examples, the access identifier may comprise a group of identifiers which may be configured to describe the user as belonging to one or more access groups. In some examples, the token may include a one-time use token. In other examples, the token may include a time-based token. For example, the token may be restricted to usage for a predetermined time period, such as at least one selected from the group of seconds, minutes, hours, days, weeks, months, years, and/or any combination thereof. After the token has been used, for example after a one-time usage and/or after expiration of a predetermined time period usage, the token may be invalidated and no longer usable.

In some examples, the first application comprising instructions for execution on the second device may be a different application than the second application comprising instructions for execution on the second device. In some examples, the second device may be a different device than the third device. In some examples, the third device may be external to the second device. For example, the third device may not be part of the second device. In some examples, the third device may be integral with the second device. For example, the third device may be a part of or internal to the second device. The third device may comprise a reader, such as a card reader. In some examples, the card reader may be configured to provide access to a physical space. In some examples, the card reader may be configured to provide access to a digital experience. In some examples, the card reader may be configured to provide access to a ticketed event. In some examples, the card reader may be configured to provide access to a safe deposit box.

In other examples, the one or more processors may be configured to receive one or more challenges via the communication interface from the first application comprising instructions for execution on the second device. The challenge may include a public key and an encrypted test. The one or more processors may be configured to transmit one or more responses that are responsive to the one or more challenges via the communication interface. For example, the one or more processors may be configured to transmit, via the communication interface, a challenge response to the first application comprising instructions for execution on the second device.

In other examples, the one or more processors may be configured to receive one or more challenges via the communication interface. For example, the one or more processors may be configured to receive a challenge from the application comprising instructions for execution on the third device. The challenge may include a public key and an encrypted test. The one or more processors may be configured to transmit one or more responses that are responsive to the one or more challenges via the communication interface. For example, the one or more processors may be configured to transmit, via the communication interface, a challenge response to the application comprising instructions for execution on the third device.

The one or more processors may be configured to decrypt the encrypted test. For example, the one or more processors may be configured to decrypt the encrypted test using the private key and generate a decrypted test. In some examples, the one or more processors may be configured to include the decrypted test in the challenge response transmitted, via the communication interface. In some examples, the one or more processors may be configured to transmit, via the communication interface, the challenge response including the decrypted test to the first application comprising instructions for execution on the second device. In other examples, the one or more processors may be configured to transmit, via the communication interface, the challenge response including the decrypted test to the second application comprising instructions for execution on the second device. In other examples, the one or more processors may be configured to transmit, via the communication interface, the challenge response including the decrypted test to the application comprising instructions for execution on the third device.

The second device and/or third device may be in data communication with one or more servers and/or one or more databases. In some examples, the first application and second application comprising instructions for execution on the second device may be in data communication with the one or more servers and/or one or more databases. The application comprising instructions for execution on the third device may be in data communication with the one or more servers and/or one or more databases. The server may be configured to receive one or more challenges from the application comprising instructions for execution on the third device. The application comprising instructions for execution on the third device may be configured to transmit the one or more challenges to the server. The challenge may include a public key and an encrypted test. The server may be configured to transmit one or more responses to the application comprising instructions for execution on the third device and that are responsive to the one or more challenges. The server may be configured to generate a decrypted test by decrypting the encrypted test using the private key. In addition, the server may be configured to include the decrypted test in the challenge response.

In some examples, the card reader may be configured to provide access to one or more resources, such as a physical space. As discussed above, the card reader may be internal to the second device. In other examples, the card reader may be external to the second device, such as a part of a third device. For example, the access may be provided after successful authentication of the token. In some examples, the card reader may be configured to provide access to the physical space after one or more entries of the communication interface into a communication field of a device associated with the card reader. Without limitation, the physical space may include any space of a building, a room, a school, a governmental agency, an elevator, or the like such that the card reader is configured to grant access thereto via the one or more entries that are part of the token validation. In some examples, the physical space may also include any space or location where mobile devices, such as a cell phone or tablet or laptop or universal serial bus device, are restricted or otherwise prohibited, such as a cloud server facility or governmental facility or any other secure facility.

In some examples, the card reader may be configured to provide access to a digital experience. As discussed above, the card reader may be internal to the second device. In other examples, the card reader may be external to the second device, such as a part of a third device. For example, the access may be provided after successful authentication of the token. In some examples, the card reader may be configured to provide access to the digital experience after one or more entries of the communication interface into a communication field of a device associated with the card reader. Without limitation, the digital experience may be associated with any application comprising instructions for execution on any device, a virtual reality program, a mobile or web browser, an email client, a game, or the like.

In some examples, the card reader may be configured to provide access to a ticketed event. As discussed above, the card reader may be internal to the second device. In other examples, the card reader may be external to the second device, such as a part of a third device. For example, the access may be provided after successful authentication of the token. In some examples, the card reader may be configured to provide access to the ticketed event after one or more entries of the communication interface into a communication field of a device associated with the card reader. Without limitation, the ticketed event may be associated with a school event, a sporting event, a concert event, a private event, a government event, a music event, or the like.

In some examples, the card reader may be configured to provide access to a safe deposit box. As discussed above, the card reader may be internal to the second device. In other examples, the card reader may be external to the second device, such as a part of a third device. For example, the access may be provided after successful authentication of the token. In some examples, the card reader may be configured to provide access to the safe deposit box after one or more entries of the communication interface into a communication field of a device associated with the card reader. In some examples, the card reader may be external to the safe deposit box. In other examples, the card reader may be internal to the safe deposit box. In some examples, the safe deposit box may comprise a storage enclosure configured to store one or more items, such as a product or grocery item, available for access to the retrievable one or more items.

Figure 4:
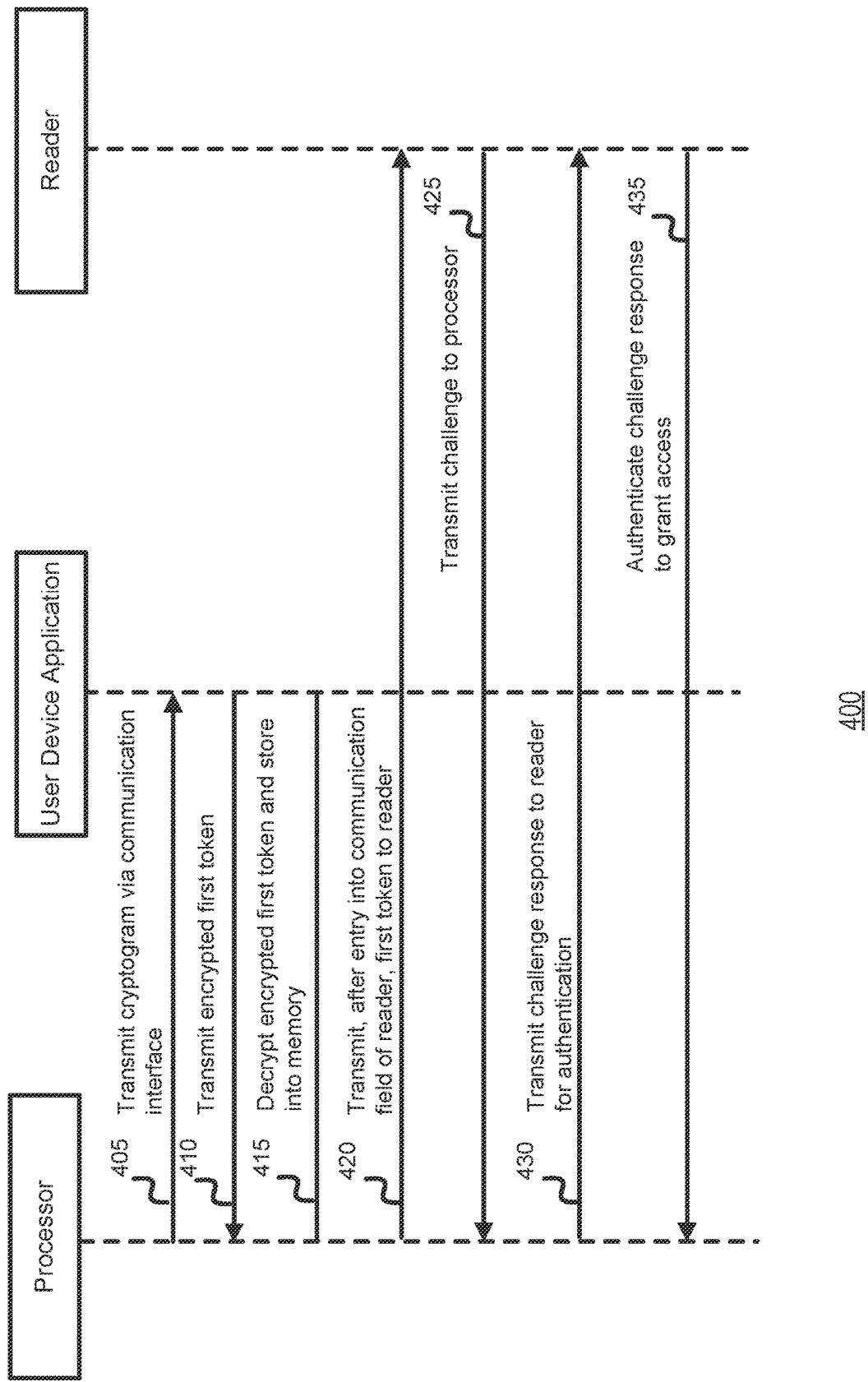
FIG. 4 depicts a sequence diagram of a process for authentication according to an exemplary embodiment.

FIG. 4 depicts a sequence diagram 400 of a process for authentication according to an exemplary embodiment. FIG. 4 may reference the same or similar components of system 100, first device 200 of FIG. 2A and FIG. 2B, and method 300 of FIG. 3.

At step 405, one or more processors may be configured to transmit a cryptogram via a communication interface. For example, one or more processors of a first device may be configured to create a cryptogram using the at least one key and the counter value. The cryptogram may include the counter value and the transmission data. The first device may include a memory containing one or more keys, including the at least one key, a counter value, and the transmission data. The first device may further include a communication interface. For example, the one or more processors may be configured to transmit the cryptogram via the communication interface. For example, the one or more processors may be configured to transmit the cryptogram to one or more applications of a user device or a second device. In some examples, the one or more processors may be configured to transmit the cryptogram to a first application comprising instructions for execution on a second device.

At step 410, an application of a user device or second device may be configured to transmit an encrypted first token. For example, the application of the user device may be configured to transmit, via a communication interface, an encrypted first token after validation of the cryptogram. The encrypted first token may comprise an encrypted access token. In some examples, the access token may be generated and/or encrypted by the first application. In some examples, the access token may be created when a user authenticates into a first or primary system, which may comprise an application, including but not limited to first application comprising instructions for execution on second device, or a network login. At that point, the access token may be created that encapsulates the security identity that has been established through presenting one or more credentials, including but not limited to at least one selected from the group of a username and/or password, a mobile device number, an account number, a card number, and a biometric (e.g., facial scan, a retina scan, a fingerprint, and a voice input for voice recognition). A database that is initially authenticated against, may be configured to create the token. In this model, the access token is then encrypted and transmitted to the first device for secure storage. When a user wishes to gain access to a second system, the first device may be presented and the second system may be configured to query for it. To the extent that the access token is still valid and the first and second systems respect each other, through a protocol such as OAuth or SAML, the user may gain access to the secondary system. In some examples, the access token may be encrypted prior to transmission. For example, the first application may be configured to encrypt the access token prior to transmission to the one or more processors of the first device.

The first token may comprise a limited use token. The access token may include one or more elements, such as an access identifier. The access identifier may be configured to allow a user to be identified across a plurality of systems, such as the first system and the second system. The access identifier may be unique to the user, tied to a login session, and/or any combination thereof. In some examples, the access identifier may comprise a group of identifiers which may be configured to describe the user as belonging to one or more access groups. In some examples, the token may include a one-time use token. In other examples, the token may include a time-based token. For example, the token may be restricted to usage for a predetermined time period, such as at least one selected from the group of seconds, minutes, hours, days, weeks, months, years, and/or any combination thereof. After the token has been used, for example after a one-time usage and/or after expiration of a predetermined time period usage, the token may be invalidated and no longer usable.

At step 415, the one or more processors may be configured to decrypt the encrypted first token and store into memory. For example, the one or more processors may be configured to receive an encrypted first token via the communication interface from the application of the user device. The decrypted first token may be stored into memory of the first device.

At step 420, the one or more processors may be configured to transmit, after entry of the communication interface into a communication field of a reader, the first token to a reader. As previously discussed, the reader may be external to the user device. In other examples, the reader may be internal to the user device. The reader may be a different device than the user device. The reader may include an application comprising instructions for execution that differs from the application comprising instructions for execution on the user device. The reader may be configured to read one or more messages from a tag, such as an NFC tag, from the first device.

The one or more processors may be configured to transmit the first token to an application comprising instructions for execution on a third device, such as a reader. The one or more processors may be configured to transmit, after one or more entries of the communication interface into a communication field of a third device, the access token. The one or more entries may be associated with at least one selected from the group of a tap, a swipe, a wave, and/or any combination thereof. The access token may be transmitted via near field communication (NFC). Without limitation, the access token may be transmitted via Bluetooth, Wi-Fi, RFID.

At step 425, the reader may be configured to transmit one or more challenges to the one or more processors. For example, the one or more processors may be configured to receive one or more challenges via the communication interface from the reader. For example, the one or more processors may be configured to receive a challenge from the application comprising instructions for execution on the third device. The challenge may include a public key and an encrypted test.

At step 430, the one or more processors may be configured to transmit one or more challenge responses, responsive to the one or more challenges, to the reader. For example, the one or more processors may be configured to transmit one or more responses that are responsive to the one or more challenges via the communication interface to the reader. For example, the one or more processors may be configured to transmit, via the communication interface, a challenge response to the application comprising instructions for execution on the third device. The one or more processors may be configured to decrypt the encrypted test. For example, the one or more processors may be configured to decrypt the encrypted test using the private key and generate a decrypted test. In some examples, the one or more processors may be configured to include the decrypted test in the challenge response transmitted, via the communication interface. For example, the one or more processors may be configured to transmit, via the communication interface, the challenge response including the decrypted test to the application comprising instructions for execution on the third device.

At step 435, the reader may be configured to authenticate the one or more challenge responses to grant access to one or more resources. In some examples, the card reader may be configured to provide access to a physical space. In some examples, the card reader may be configured to provide access to a digital experience. In some examples, the card reader may be configured to provide access to a ticketed event. In some examples, the card reader may be configured to provide access to a safe deposit box.

In some examples, the card reader may be configured to provide access to one or more resources, such as a physical space. As discussed above, the card reader may be internal to the second device. In other examples, the card reader may be external to the second device, such as a part of a third device. For example, the access may be provided after successful authentication of the token. In some examples, the card reader may be configured to provide access to the physical space after one or more entries of the communication interface into a communication field of a device associated with the card reader. Without limitation, the physical space may include any space of a building, a room, a school, a governmental agency, an elevator, or the like such that the card reader is configured to grant access thereto via the one or more entries that are part of the token validation. In some examples, the physical space may also include any space or location where mobile devices, such as a cell phone or tablet or laptop or universal serial bus device, are restricted or otherwise prohibited, such as a cloud server facility or governmental facility or any other secure facility.

In some examples, the card reader may be configured to provide access to a digital experience. As discussed above, the card reader may be internal to the second device. In other examples, the card reader may be external to the second device, such as a part of a third device. For example, the access may be provided after successful authentication of the token. In some examples, the card reader may be configured to provide access to the digital experience after one or more entries of the communication interface into a communication field of a device associated with the card reader. Without limitation, the digital experience may be associated with any application comprising instructions for execution on any device, a virtual reality program, a mobile or web browser, an email client, a game, or the like.

In some examples, the card reader may be configured to provide access to a ticketed event. As discussed above, the card reader may be internal to the second device. In other examples, the card reader may be external to the second device, such as a part of a third device. For example, the access may be provided after successful authentication of the token. In some examples, the card reader may be configured to provide access to the ticketed event after one or more entries of the communication interface into a communication field of a device associated with the card reader. Without limitation, the ticketed event may be associated with a school event, a sporting event, a concert event, a private event, a government event, a music event, or the like.

In some examples, the card reader may be configured to provide access to a safe deposit box. As discussed above, the card reader may be internal to the second device. In other examples, the card reader may be external to the second device, such as a part of a third device. For example, the access may be provided after successful authentication of the token. In some examples, the card reader may be configured to provide access to the safe deposit box after one or more entries of the communication interface into a communication field of a device associated with the card reader. In some examples, the card reader may be external to the safe deposit box. In other examples, the card reader may be internal to the safe deposit box. In some examples, the safe deposit box may comprise a storage enclosure configured to store one or more items, such as a product or grocery item, available for access to the retrievable one or more items.

Figure 5:
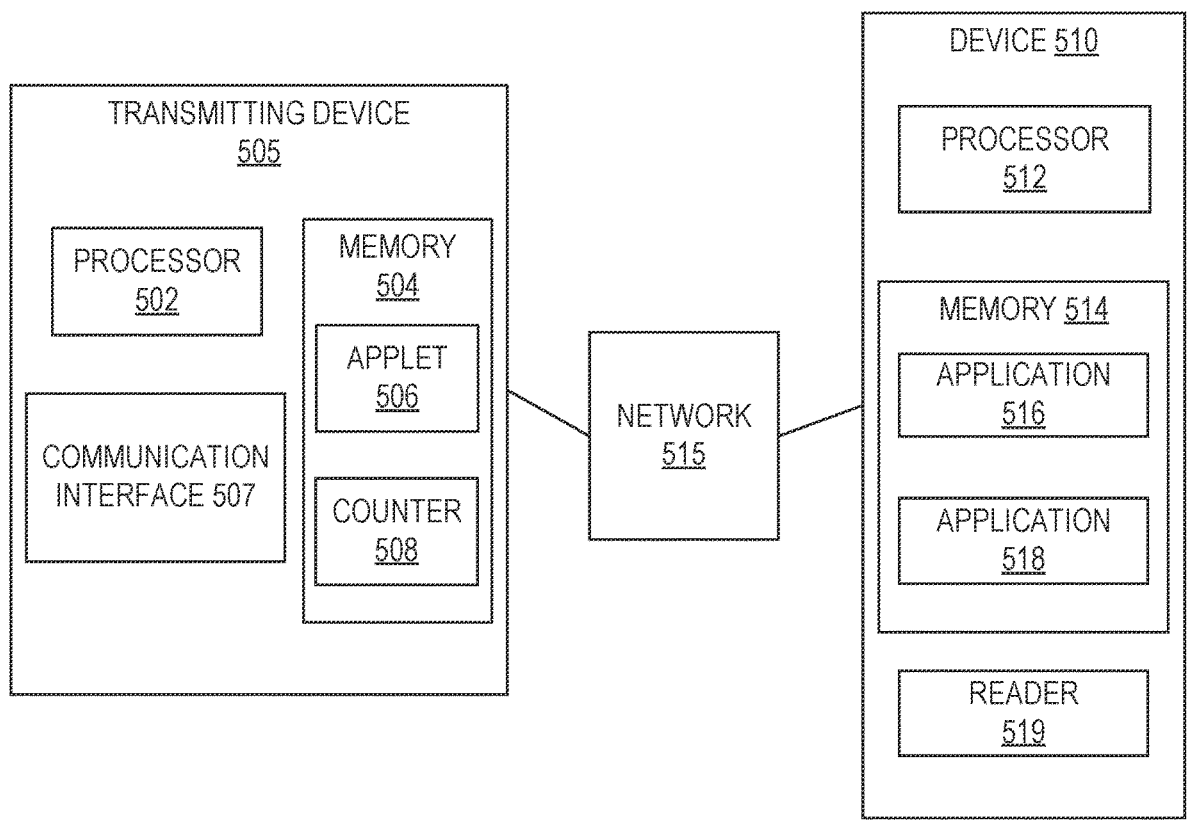
FIG. 5 depicts an authentication system according to an exemplary embodiment.

FIG. 5 depicts an authentication system 500 according to an exemplary embodiment. FIG. 5 may reference the same or similar components of system 100, first device 200 of FIG. 2A and FIG. 2B, method 300 of FIG. 3, and sequence diagram 400 of FIG. 4. Authentication system 500 may include first device 505, second device 510, and network 515. Although FIG. 5 illustrates single instances of components of system 500, system 500 may include any number of components.

System 500 may include a first device 505. The first device 505 may comprise a contactless card, a contact-based card, or other device described herein. As previously explained, first device 505 may include one or more processors 502, and memory 504. Memory 504 may include one or more applets 506 and one or more counters 508. Each counter 508 may include a counter value. Memory 504 may include the counter value, transmission data, and at least one key.

First device 505 may include a communication interface 507. The communication interface 507 may comprise communication capabilities with physical interfaces and contactless interfaces. For example, the communication interface 507 may be configured to communicate with a physical interface, such as by swiping through a card swipe interface or inserting into a card chip reader found on an automated teller machine (ATM) or other device configured to communicate over a physical interface. In other examples, the communication interface 507 may be configured to establish contactless communication with a card reading device via a short-range wireless communication method, such as NFC, Bluetooth, Wi-Fi, RFID, and other forms of contactless communication. As shown in FIG. 5, the communication interface 507 may be configured to communicate directly with the second device 510 via network 515.

First device 505 may be in data communication with any number of components of system 100. For example, first device 505 may transmit data via network 515 to second device 510. First device 505 may transmit and/or receive data via network 515. In some examples, first device 505 may be configured to transmit data via network 515 after entry of communication interface 507 into one or more communication fields of any device. Without limitation, each entry may be associated with a tap, a swipe, a wave, and/or any combination thereof.

System 500 may include a second device 510. The second device 510 may include one or more processors 512, memory 514, and reader 519. Memory 514 may include one or more applications, including but not limited to first application 516 and second application 518. The reader 519 may be configured to read one or more messages from a tag, such as an NFC tag, from the first device 505. Second device 510 may be in data communication with any number of components of system 500. For example, second device 510 may transmit and/or receive data via network 515 to and from first device 505. Without limitation, second device 510 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. Second device 510 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 510 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 510 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 500 may include a network 515. In some examples, network 515 may be one or more of a wireless network, a wired network or any combination of wireless network and wired network, and may be configured to connect to any one of components of system 500. For example, first device 505 may be configured to connect to device 510 via network 515. In some examples, network 515 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 515 may include, without limitation, telephone lines, fiber optics, IEEE Ethernet 902.3, a wide area network, a wireless personal area network, a LAN, or a global network such as the Internet. In addition, network 515 may support an Internet network, a wireless communication network, a cellular network, or the like, or any combination thereof. Network 515 may further include one network, or any number of the exemplary types of networks mentioned above, operating as a stand-alone network or in cooperation with each other. Network 515 may utilize one or more protocols of one or more network elements to which they are communicatively coupled. Network 515 may translate to or from other protocols to one or more protocols of network devices. Although network 515 is depicted as a single network, it should be appreciated that according to one or more examples, network 515 may comprise a plurality of interconnected networks, such as, for example, the Internet, a service provider's network, a cable television network, corporate networks, such as credit card association networks, and home networks.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 505, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The one or more processors 502 may be configured to create a cryptogram using the at least one key and the counter value. The cryptogram may include the counter value and the transmission data. The one or more processors 502 may be configured to transmit the cryptogram via the communication interface 507. For example, the one or more processors 502 may be configured to transmit the cryptogram to one or more applications for verification. In some examples, the one or more processors 502 may be configured to transmit the cryptogram to a first application 516 comprising instructions for execution on a second device 510. The one or more processors 502 may be configured to update the counter value after transmission and verification of the cryptogram. The one or more processors 502 may be configured to receive an access token via the communication interface 507 after verification of the cryptogram. For example, the one or more processors 502 may be configured to receive the access token from the first application 516. In some examples, the access token may be generated and/or encrypted by the first application 516. In some examples, the access token may be created when a user authenticates into a first or primary system, which may comprise an application, including but not limited to first application 516 comprising instructions for execution on first device 510, or a network login, including but not limited to login associated with network 515. At that point, the access token may be created that encapsulates the security identity that has been established through presenting one or more credentials, including but not limited to at least one selected from the group of a username and/or password, a mobile device number, an account number, a card number, and a biometric (e.g., facial scan, a retina scan, a fingerprint, and a voice input for voice recognition). A database may also be included of system 500 and is initially authenticated against, may be configured to create the token. In this model, the access token is then encrypted and transmitted to the first device 505 for secure storage. When a user wishes to gain access to a second system, the first device 505 may be presented and the second system may be configured to query for it. To the extent that the access token is still valid and the first and second systems respect each other, through a protocol such as OAuth or SAM), the user may gain access to the secondary system. In some examples, the access token may be encrypted prior to transmission. For example, the first application 516 may be configured to encrypt the access token prior to transmission to the one or more processors 502 of the first device 505.

The one or more processors 502 may be configured to decrypt the access token. The one or more processors 502 may be configured to store the access token in the memory 504. The one or more processors 502 may be configured to transmit, after one or more entries of the communication interface 507 into a communication field of any device, the access token. The one or more entries may be associated with at least one selected from the group of a tap, a swipe, a wave, and/or any combination thereof. For example, the one or more processors 502 may be configured to transmit the access token to the first application 516. The access token may be transmitted via near field communication (NFC). Without limitation, the access token may be transmitted via Bluetooth, Wi-Fi, RFID.

The one or more processors 502 may be configured to transmit the access token to a second application 518 comprising instructions for execution on the second device 510. The one or more processors 502 may be configured to transmit, after one or more entries of the communication interface 507 into a communication field of the second device 510, the access token. The one or more entries may be associated with at least one selected from the group of a tap, a swipe, a wave, and/or any combination thereof. For example, the one or more processors 102 may be configured to transmit the access token to the second application 518. The access token may be transmitted via near field communication (NFC). Without limitation, the access token may be transmitted via Bluetooth, Wi-Fi, RFID. The access token may be transmitted for verification prior to providing access to one or more resources, as previously explained.

The access token may comprise a limited use token. The access token may include one or more elements, such as an access identifier. The access identifier may be configured to allow a user to be identified across a plurality of systems, such as the first system and the second system. The access identifier may be unique to the user, tied to a login session, and/or any combination thereof. In some examples, the access identifier may comprise a group of identifiers which may be configured to describe the user as belonging to one or more access groups. In some examples, the token may include a one-time use token. In other examples, the token may include a time-based token. For example, the token may be restricted to usage for a predetermined time period, such as at least one selected from the group of seconds, minutes, hours, days, weeks, months, years, and/or any combination thereof. After the token has been used, for example after a one-time usage and/or after expiration of a predetermined time period usage, the token may be invalidated and no longer usable.

In some examples, the first application 516 comprising instructions for execution on the second device 510 may be a different application than the second application 518 comprising instructions for execution on the second device 510. In some examples, the card reader 519 may be configured to provide access to a physical space. In some examples, the card reader 519 may be configured to provide access to a digital experience. In some examples, the card reader 519 may be configured to provide access to a ticketed event. In some examples, the card reader 519 may be configured to provide access to a safe deposit box.

In other examples, the one or more processors 502 may be configured to receive one or more challenges via the communication interface 507 from the first application 516 or second application 518 comprising instructions for execution on the second device 510. The challenge may include a public key and an encrypted test. The one or more processors 502 may be configured to transmit one or more responses that are responsive to the one or more challenges via the communication interface 507. For example, the one or more processors 502 may be configured to transmit, via the communication interface 507, a challenge response to the first application 516 or second application 518 comprising instructions for execution on the second device 510.

The one or more processors 502 may be configured to decrypt the encrypted test. For example, the one or more processors 502 may be configured to decrypt the encrypted test using the private key and generate a decrypted test. In some examples, the one or more processors 502 may be configured to include the decrypted test in the challenge response transmitted, via the communication interface 507. In some examples, the one or more processors 502 may be configured to transmit, via the communication interface 507, the challenge response including the decrypted test to the first application 516 or second application 518 comprising instructions for execution on the second device 510.

In some examples, the card reader 519 may be configured to provide access to one or more resources, such as a physical space. As discussed above, the card reader may be internal to the second device 510. For example, the access may be provided after successful authentication of the token. In some examples, the card reader 519 may be configured to provide access to the physical space after one or more entries of the communication interface 507 into a communication field of a device, such as device 510, associated with the card reader 519. Without limitation, the physical space may include any space of a building, a room, a school, a governmental agency, an elevator, or the like such that the card reader is configured to grant access thereto via the one or more entries that are part of the token validation. In some examples, the physical space may also include any space or location where mobile devices, such as a cell phone or tablet or laptop or universal serial bus device, are restricted or otherwise prohibited, such as a cloud server facility or governmental facility or any other secure facility.

In some examples, the card reader 519 may be configured to provide access to a digital experience. As discussed above, the card reader may be internal to the second device 510. For example, the access may be provided after successful authentication of the token. In some examples, the card reader 519 may be configured to provide access to the digital experience after one or more entries of the communication interface 507 into a communication field of a device, such as device 510, associated with the card reader 519. Without limitation, the digital experience may be associated with any application comprising instructions for execution on any device, a virtual reality program, a mobile or web browser, an email client, a game, or the like. In some examples, the first application 516 may be configured to generate and transmit the access token to the first device 505, and the second application 518 may be associated with the digital experience.

In some examples, the card reader 519 may be configured to provide access to a ticketed event. As discussed above, the card reader may be internal to the second device 510. For example, the access may be provided after successful authentication of the token. In some examples, the card reader 519 may be configured to provide access to the ticketed event after one or more entries of the communication interface 507 into a communication field of a device, such as device 510, associated with the card reader 519. Without limitation, the ticketed event may be associated with a school event, a sporting event, a concert event, a private event, a government event, a music event, or the like.

In some examples, the card reader 519 may be configured to provide access to a safe deposit box. As discussed above, the card reader 519 may be internal to the second device 510. For example, the access may be provided after successful authentication of the token. In some examples, the card reader 519 may be configured to provide access to the safe deposit box after one or more entries of the communication interface 507 into a communication field of a device, such as device 510, associated with the card reader 519. In some examples, the card reader may be external to the safe deposit box. In some examples, the safe deposit box may comprise a storage enclosure configured to store one or more items, such as a product or grocery item, available for access to the retrievable one or more items.

Figure 6:
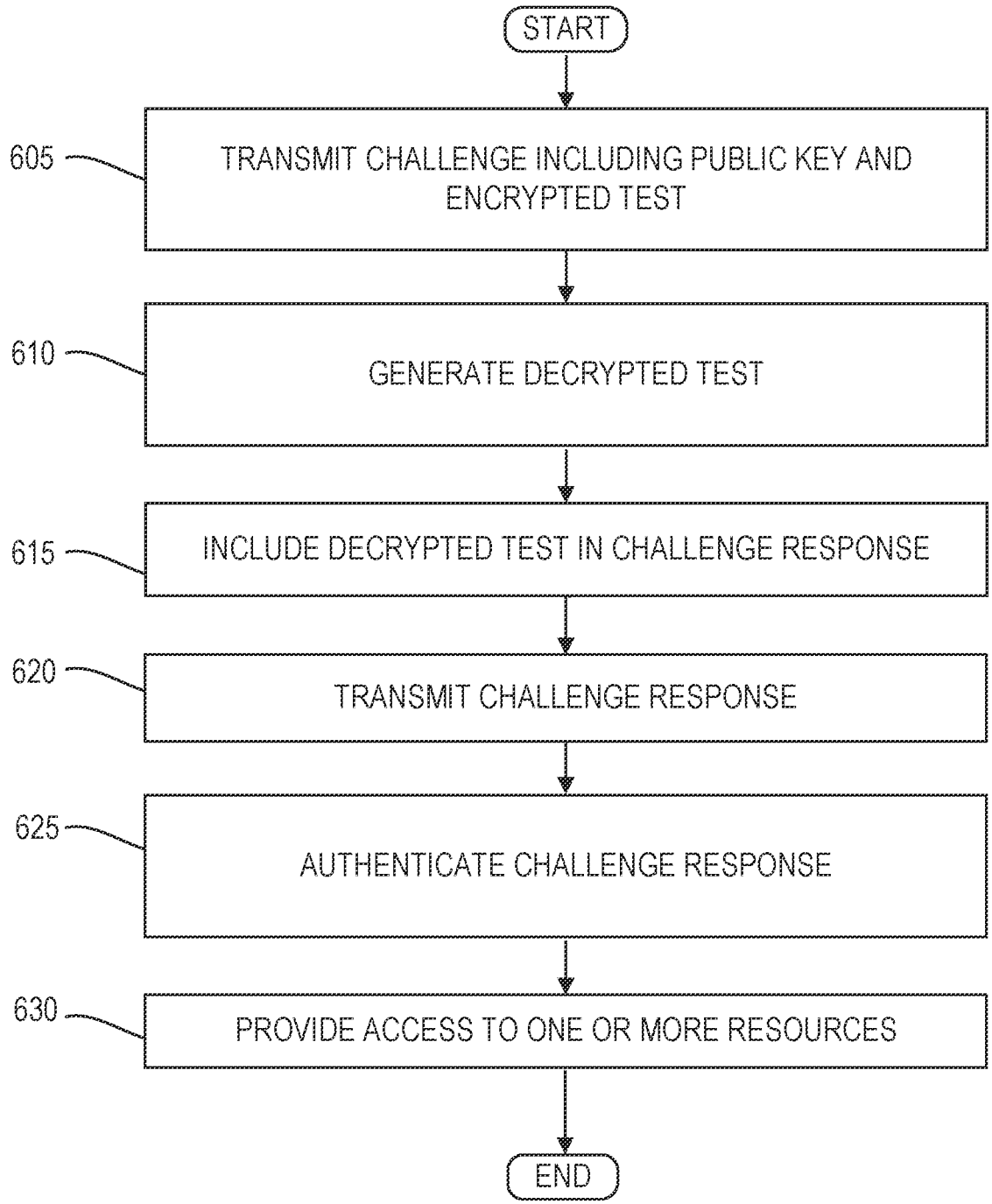
FIG. 6 depicts a method of authentication according to an exemplary embodiment.

FIG. 6 depicts a method 600 of authentication according to an exemplary embodiment. FIG. 6 may reference the same or similar components of system 100, first device 200 of FIG. 2A and FIG. 2B, method 300 of FIG. 3, sequence diagram 400 of FIG. 4, and system 500 of FIG. 5.

At block 605, the method 600 may include transmitting a challenge including a public key and an encrypted test. For example, an application comprising instructions for execution on a device, such as a client device or a card reader, may be configured to transmit one or more challenges via a communication interface of a first device. One or more processors of the first device may be configured to receive one or more challenges via a communication interface from an application comprising instructions for execution on a device. The challenge may include a public key and an encrypted test. In some examples, the challenge may be transmitted after authentication of the token, as previously explained above.

At block 610, the method 600 may include generating a decrypted test. For example, the one or more processors may be configured to decrypt the encrypted test. For example, the one or more processors may be configured to decrypt the encrypted test using the private key and generate a decrypted test.

At block 615, the method 600 may include including the decrypted test in the challenge response. For example, the one or more processors may be configured to include the decrypted test in the challenge response transmitted via the communication interface.

At block 620, the method 600 may include transmitting the challenge response. For example, the one or more processors may be configured to transmit one or more responses that are responsive to the one or more challenges via the communication interface. For example, the one or more processors may be configured to transmit, via the communication interface, a challenge response to the application comprising instructions for execution on the device, such as a client device or card reader.

At block 625, the method 600 may include authenticating the challenge response. For example, the application comprising instructions for execution on the device, such as the client device or card reader, may be configured to authenticate the challenge response received from the one or more processors. In some examples, the application may be configured to determine if the one or more responses indicate decryption of the encrypted test. For example, if the one or more responses indicate successful decryption of the encrypted test, the response may be deemed authenticated. If the one or more responses indicate unsuccessful decryption of the encrypted test the response may be unauthenticated. In some examples, the one or more processors may be configured to re-transmit the one or more responses including successful decryption of the encrypted test. The re-transmission of the one or more responses may include a predetermined threshold number of attempts, such as one or more entries of the communication interface of the first device into one or more communication fields of a device, such as a client device or card reader, prior to timing out the authentication process. In another example, the re-transmission of the one or more responses may also be subject to a predetermined threshold time period of attempts, such as one or more entries of the communication interface of the communication interface into one or more communication fields of a device, such as a client device or card reader, prior to timing out the authentication process. The predetermined threshold time period may include at least one selected from the group of seconds, minutes, hours, days, weeks, months, years, or the like, and/or any combination thereof.

In some examples, the application may be configured to authenticate the challenge response by decrypting the response with a private key. In other examples, the application may be configured to authenticate the challenge response by transmitting one or more requests to one or more servers and/or one or more databases. For example, the one or more servers may be configured to receive the one or more requests for authentication from the application. The one or more servers may be configured to decrypt the challenge response via a private key. In other examples, the one or more databases may be configured to receive the one or more requests for authentication from the one or more servers. The one or more databases may be configured to decrypt the challenge response via a private key.

At block 630, the method 600 may include providing access to one or more resources. For example, the access to one or more resources may be conditioned on the determination of an outcome associated with the authentication of the challenge response. In this manner, access to the one or more resources may be denied or granted based on the determination of the authenticated challenge response. In some examples, the card reader may be configured to provide access to one or more resources, such as a physical space. As discussed above, the card reader may be internal to the client device. In other examples, the card reader may be external to the client device, such as a part of a third device. For example, the access may be provided after successful authentication of the challenge response. In some examples, the card reader may be configured to provide access to the physical space after one or more entries of the communication interface into a communication field of a device associated with the card reader. Without limitation, the physical space may include any space of a building, a room, a school, a governmental agency, an elevator, or the like such that the card reader is configured to grant access thereto via the one or more entries that are part of the token validation. In some examples, the physical space may also include any space or location where mobile devices, such as a cell phone or tablet or laptop or universal serial bus device, are restricted or otherwise prohibited, such as a cloud server facility or governmental facility or any other secure facility.

In some examples, the card reader may be configured to provide access to a digital experience. As discussed above, the card reader may be internal to the client device. In other examples, the card reader may be external to the client device, such as a part of a third device. For example, the access may be provided after successful authentication of the challenge response. In some examples, the card reader may be configured to provide access to the digital experience after one or more entries of the communication interface into a communication field of a device associated with the card reader. Without limitation, the digital experience may be associated with any application comprising instructions for execution on any device, a virtual reality program, a mobile or web browser, an email client, a game, or the like.

In some examples, the card reader may be configured to provide access to a ticketed event. As discussed above, the card reader may be internal to the client device. In other examples, the card reader may be external to the client device, such as a part of a third device. For example, the access may be provided after successful authentication of the challenge response. In some examples, the card reader may be configured to provide access to the ticketed event after one or more entries of the communication interface into a communication field of a device associated with the card reader. Without limitation, the ticketed event may be associated with a school event, a sporting event, a concert event, a private event, a government event, a music event, or the like.

In some examples, the card reader may be configured to provide access to a safe deposit box. As discussed above, the card reader may be internal to the client device. In other examples, the card reader may be external to the client device, such as a part of a third device. For example, the access may be provided after successful authentication of the challenge response. In some examples, the card reader may be configured to provide access to the safe deposit box after one or more entries of the communication interface into a communication field of a device associated with the card reader. In some examples, the card reader may be external to the safe deposit box. In other examples, the card reader may be internal to the safe deposit box. In some examples, the safe deposit box may comprise a storage enclosure configured to store one or more items, such as a product or grocery item, available for access to the retrievable one or more items.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A contactless card with writeable access tokens, comprising:
   a memory storing a key, an applet in communication with a first application stored on a mobile device, and transmission data comprising one or more identification credentials associated with the user;
   a communication interface; and
   one or more processors in communication with the applet stored in the memory and the communication interface, wherein the one or more processors are configured to:
   execute the applet to create a cryptogram, using the key, wherein:
   the cryptogram includes a request for an access token and the transmission data,
   transmit the cryptogram to the first application running on the mobile device;
   validate, by the first application, the transmission data included in the cryptogram;
   generate, by the first application, the access token, upon successful validation of the transmission data, wherein the access token provides access credentials to a second system that is distinct from the contactless card and the mobile device associated with the user;
   transmit, by the first application, an encrypted message to the card, wherein the encrypted message includes the access token;
   decrypt, by the card, the access token using the key stored in the memory of the card;
   store the access token in the memory of the contactless card, the access token being transmittable from the contactless card upon being queried by the second system; and
   transmit, after entry of the communication interface into a communication field, the access token to a reader associated with the second system to which the user requires access.

2. The contactless card of claim 1, wherein the one or more processors are further configured to receive a challenge, from the second system, via the communication interface, wherein the challenge includes a public key and an encrypted test.

3. The contactless card of claim 2, wherein the one or more processors are further configured to transmit, responsive to the challenge, a challenge response via the communication interface.

4. The contactless card of claim 2, wherein the one or more processors are further configured to decrypt the encrypted test and include the decrypted test, along with the access token stored on the card, in the challenge response transmitted to the second system via the communication interface.

5. The contactless card of claim 1, wherein the one or more processors are further configured to encrypt the access token, being transmitted to the reader associated with the second system, using a public key associated with the second system.

6. The contactless card of claim 1, wherein each entry of the communication interface into the communication field generates a challenge.

7. The contactless card of claim 1, wherein the access token comprises a limited use token.

8. The card of claim 1, wherein the access token generated by the first application encapsulates a security identity established through verification of the one or more identification credentials contained within the cryptogram transmitted by the contactless card.

9. The contactless card of claim 1, wherein the second system queries an authentication system to verify a validity of the access token received from the contactless card.

10. The contactless card of claim 1, wherein the second system is configured to validate the access token transmitted by the card using one of an Open Authorization (OAuth) protocol and Security Assertion Markup Language (SAML) protocol.

11. The contactless card of claim 1, wherein the applet executing on the contactless card is communicatively coupled to the first application, running on the mobile device, using Near Field Communication (NFC).

12. The contactless card of claim 1, wherein the verification of the one or more user identification credentials in the cryptogram received by the first application running on the mobile device is performed by an authentication database communicatively coupled to the first application.

13. An authentication method, comprising:
    storing, on a contactless card having integrated memory and processor, a key, one or more identification credentials associated with a user, and an applet in communication with an application running on a device associated with the user;
    transmitting a cryptogram created by executing the applet, to the application running on the device associated with the user, wherein the cryptogram comprises the one or more identification credentials encrypted with the key;
    transmitting, by the application and in response to receiving the cryptogram, an access token to the applet executing on the contactless card, wherein the access token is generated upon validation of the one or more identification credentials decrypted using the key, the access token being encrypted by the application prior to transmission to the applet executing on the contactless card;
    decrypting, by the applet executing on the contactless card, the access token using the key;
    storing the decrypted access token on the contactless card, the access token being transmittable from the contactless card upon being queried by a second system, the second system being distinct from the contactless card and the device associated with the user; and
    transmitting, after entry of the communication interface into a communication field, the access token to a reader associated with the second system to thereby grant the user access to the second system.

14. The authentication method of claim 13, further comprising:
    receiving, via the communication interface, a challenge from the second system, wherein the challenge includes a public key associated with the second system and an encrypted test.

15. The authentication method of claim 14, further comprising:
    transmitting, responsive to the challenge, a challenge response encrypted with the public key of the second system to the reader via the communication interface, the challenge response including a decrypted test and the access token.

16. The authentication method of claim 13, further comprising receiving a challenge based on each entry of the communication interface into the communication field.

17. The authentication method of claim 13, further comprising invalidating the access token after expiration of a predetermined time period.

18. The method of claim 13, wherein the access token comprises an access identifiers for identifying one or more access privileges granted via the access token.

19. A computer readable non-transitory medium comprising computer executable instructions that are executed on a processor and comprising the steps of:
    storing, on a contactless card having integrated memory and processor, a key, one or more identification credentials associated with a user, and an applet in communication with an application running on a device associated with the user;
    transmitting a cryptogram created by executing the applet, to the application running on the device associated with the user, wherein the cryptogram comprises the one or more identification credentials encrypted with the key;
    transmitting, by the application and in response to receiving the cryptogram, an access token to the applet executing on the contactless card, wherein the access token is generated upon validation of the one or more identification credentials decrypted using the key, the access token being encrypted by the application prior to transmission to the applet executing on the contactless card;
    decrypting, by the applet executing on the contactless card, the access token using the key;
    storing the decrypted access token on the contactless card, the access token being transmittable from the contactless card upon being queried by a second system, the second system being distinct from the contactless card and the device associated with the user; and
    transmitting, after entry of the communication interface into a communication field, the access token to a reader associated with the second system to thereby grant the user access to the second system.

* * * * *